US012777506B2

(12) United States Patent
Kumar et al.

(10) Patent No.: US 12,777,506 B2
(45) Date of Patent: Oct. 27, 2026

(54) DETERMINING TIME IN GNSS DENIED ENVIRONMENT

(71) Applicant: QUALCOMM Incorporated, San Diego, CA (US)

(72) Inventors: Mukesh Kumar, Bangalore (IN); Chandrasekhar Jayaram, Bangalore (IN); Srinivas Gangji, Bangalore (IN); Santoshkumar Zalake, Bengaluru (IN)

(73) Assignee: QUALCOMM Incorporated, San Diego, CA (US)

( * ) Notice: Subject to any disclaimer, the term of this patent is extended or adjusted under 35 U.S.C. 154(b) by 415 days.

(21) Appl. No.: 18/476,100

(22) Filed: Sep. 27, 2023

(65) Prior Publication Data

US 2025/0106877 A1 Mar. 27, 2025

(51) Int. Cl.
*H04W 72/40* (2023.01)

(52) U.S. Cl.
CPC .................................... *H04W 72/40* (2023.01)

(58) Field of Classification Search
CPC ... H04W 72/231; H04W 72/25; H04W 64/00; H04W 72/40; G01S 5/0072; G01S 5/02685; G01S 5/0205; G01S 5/0244; G01S 5/0263
See application file for complete search history.

(56) References Cited

U.S. PATENT DOCUMENTS 10,257,647 B2 * 4/2019 Kordybach ............. H04W 4/46
11,002,859 B1 * 5/2021 Zhang ................... G01S 19/393
2009/0298437 A1 * 12/2009 Hoefel .................. H04W 48/16 455/67.11
2016/0081027 A1 * 3/2016 Ganesh ............... H04W 36/249 370/311
2016/0212594 A1 * 7/2016 Morita .................. H04W 76/14
2019/0059071 A1 * 2/2019 Khoryaev ............. H04W 4/021
2020/0260386 A1 * 8/2020 Ryu ...................... H04W 76/14
2021/0084461 A1 * 3/2021 Kim ........................ H04W 4/40
2022/0312457 A1 * 9/2022 Wang ................ H04W 72/1263
2022/0342086 A1 * 10/2022 Yoshida .................. G01S 19/47
2023/0138096 A1 * 5/2023 Zhao ................. H04W 74/0816 370/329
2024/0056997 A1 * 2/2024 Hoang .................. H04W 64/00
2024/0259989 A1 * 8/2024 Li ......................... G01S 5/0244

FOREIGN PATENT DOCUMENTS

JP 2023015237 A * 1/2023

* cited by examiner

*Primary Examiner* — Atique Ahmed
(74) *Attorney, Agent, or Firm* — Procopio, Cory, Hargreaves & Savitch LLP

(57) ABSTRACT

Apparatus, methods, and computer program products for determining a time are provided. An example method may include receiving, in a global navigation satellite system (GNSS) denied environment, a plurality of sidelink messages from a plurality of sources. The example method may further include selecting a time source from the plurality of sources based on the plurality of sidelink messages and based on at least one of: a respective distance traveled within the GNSS denied environment associated with each source of the plurality of sources or a respective time inside the GNSS denied environment of the plurality of sources. The example method may further include performing, based on a time provided by the time source, at least one of a positioning activity, a timing maintenance activity, or a communication activity.

30 Claims, 10 Drawing Sheets

DETERMINING TIME IN GNSS DENIED ENVIRONMENT

TECHNICAL FIELD

The present disclosure relates generally to communication systems, and more particularly, to determining a time for sidelink communications or positioning.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus at a wireless device are provided. The apparatus may include at least one memory and at least one processor coupled to the at least one memory. Based at least in part on information stored in the at least one memory, the at least one processor, individually or in any combination, is configured to receiving, in a global navigation satellite system (GNSS) denied environment, a plurality of sidelink messages from a plurality of sources. Based at least in part on information stored in the at least one memory, the at least one processor, individually or in any combination, is configured to selecting a time source from the plurality of sources based on the plurality of sidelink messages and based on at least one of: a respective distance traveled within the GNSS denied environment associated with each source of the plurality of sources or a respective time inside the GNSS denied environment of the plurality of sources. Based at least in part on information stored in the at least one memory, the at least one processor, individually or in any combination, is configured to performing, based on a time provided by the time source, at least one of a positioning activity, a timing maintenance activity, or a communication activity.

To the accomplishment of the foregoing and related ends, the one or more aspects include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
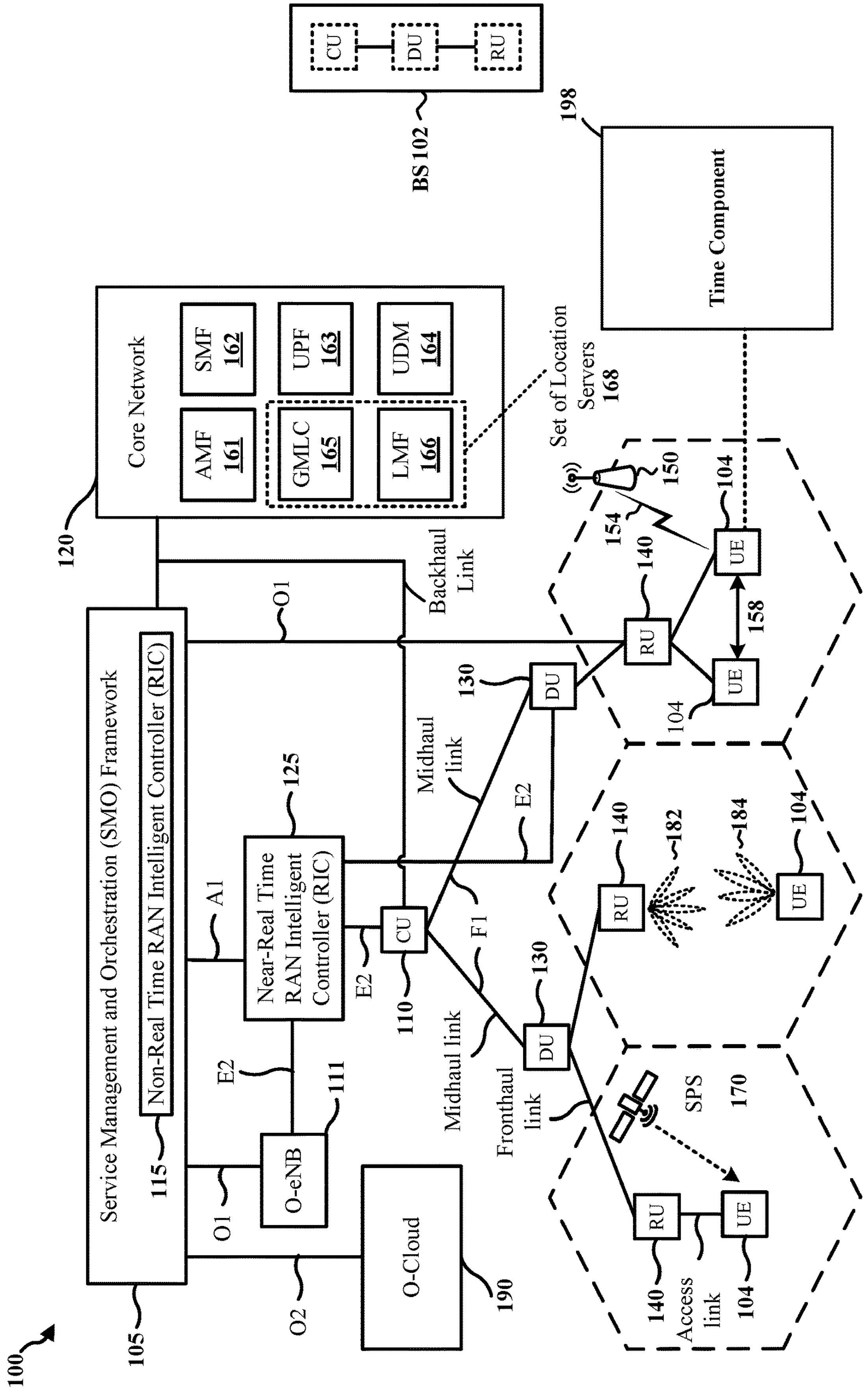
FIG. 1 is a diagram illustrating an example of a wireless communications system and an access network.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

A vehicle may enter a global navigation satellite system (GNSS) denied environment where a GNSS signal is not available for the vehicle. As used herein, the term "GNSS denied environment" may refer to an environment in the physical world where GNSS signal is not available for the vehicle, such as a tunnel where GNSS signal is not available for the vehicle, a parking lot or garage where GNSS signal is not available for the vehicle, another environment where GNSS signal is not available for the vehicle, an environment that the vehicle might be in during a GNSS system outage, or the like. In such an environment, the vehicle may not have GNSS signal available as a time source to determine the current time (e.g., coordinated universal time (UTC) time). An environment where GNSS signal is available for the vehicle may be referred to as a "GNSS enabled environment." As used herein, the term "time source," "timing source," or "source" may be a wireless device, such as another vehicle or a road-side-unit (RSU) where the vehicle may determine a current time (e.g., the current UTC time) based on receiving and decoding messages from the source. The current time may be used for positioning activity, a timing maintenance activity, or a communication activity. As used herein, the term "positioning activity" may refer to positioning performed to determine the position or location associated with the vehicle or another vehicle inside a GNSS denied environment, a GNSS enabled environment, when the vehicle moves from the GNSS denied environment to the GNSS enabled environment or vice versa. As used herein, the term "timing maintenance activity" may refer to the activity of keeping track of a current time to facilitate other activities in a GNSS denied environment. As used herein, the term "communication activity" may refer to transmission of V2X messages or reception and decoding of V2X messages.

For an on-board-unit (OBU) associated with a vehicle may not be able to transmit vehicle-to-everything (V2X) messages for sidelink synchronization signal (SLSS) if a UTC time uncertainty is greater than one millisecond (e.g., the vehicle is uncertain about the current UTC time by more than one millisecond). As another example, when the vehicle moves out from a GNSS denied environment, the vehicle may determine its position based on resynchronizing with the GNSS system (e.g., receiving GNSS signal after not receiving GNSS signal for a period of time). A larger uncertainty regarding the current time may result in longer resynchronizing time or a less accurate initial estimate. Aspects provided herein may enable determining a more accurate current time in a GNSS denied environment for facilitating positioning activity, a timing maintenance activity, or a communication activity.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell). Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6

GHZ, may be within FR1, or may include mid-band frequencies. Further, unless specifically stated otherwise, the term “millimeter wave” or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

A link between a UE 104 and a base station 102 may be established as an access link, e.g., using a UE-UTRAN (Uu) interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU), etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

Referring again to FIG. 1, in some aspects, the UE 104 may include a time component 198. In some aspects, the time component 198 may be configured to receive, in a GNSS denied environment, a plurality of sidelink messages from a plurality of sources. In some aspects, the time component 198 may be configured to select a time source from the plurality of sources based on the plurality of sidelink messages and based on at least one of: a respective distance traveled within the GNSS denied environment associated with each source of the plurality of sources or a respective time inside the GNSS denied environment of the plurality of sources. In some aspects, the time component 198 may be configured to perform, based on a time provided by the time source, at least one of a positioning activity, a timing maintenance activity, or a communication activity.

Although the following description may be focused on 5G NR, the concepts described herein may be applicable to other similar areas, such as LTE, LTE-A, CDMA, GSM, and other wireless technologies.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

Figure 2:
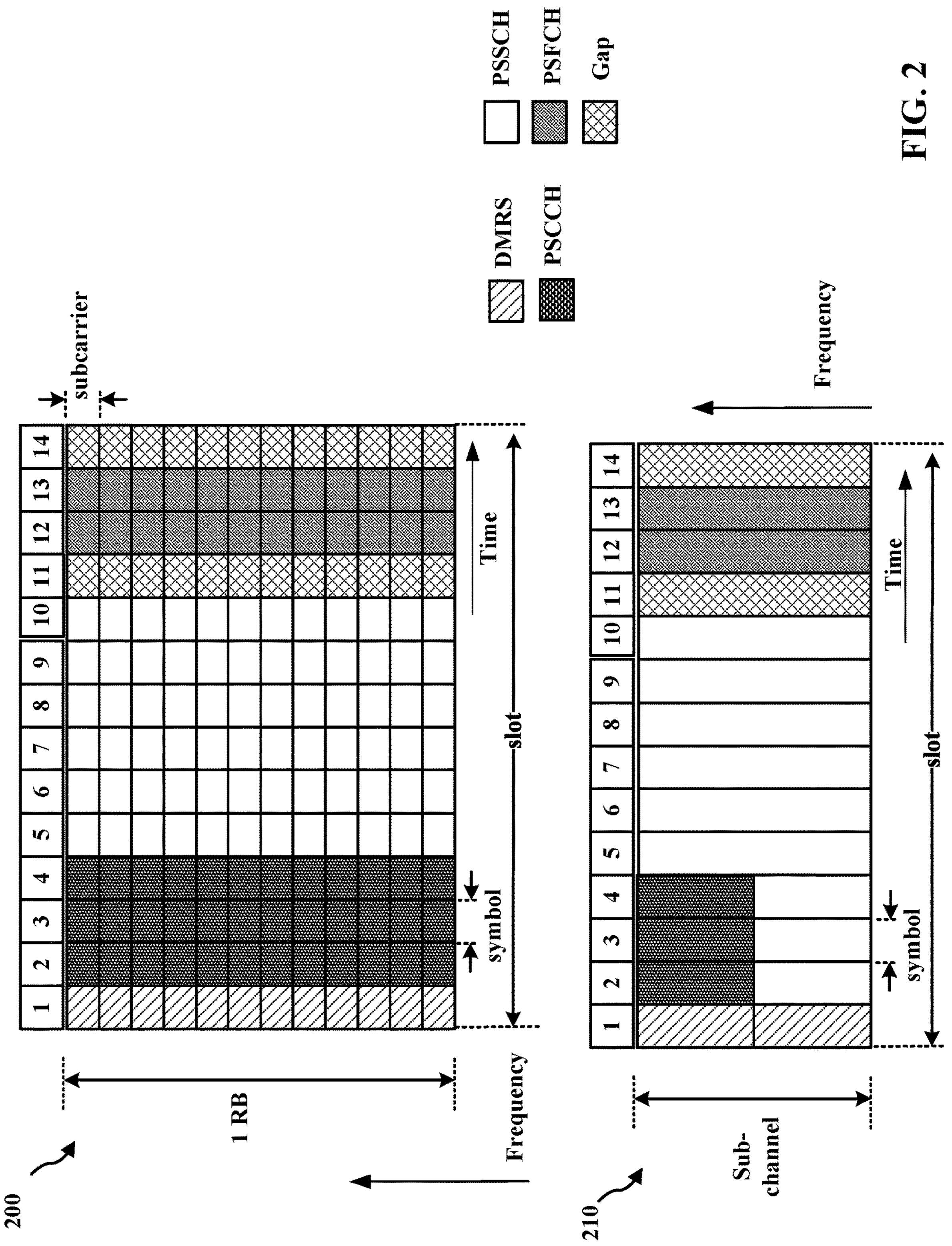
FIG. 2 illustrates example aspects of a sidelink slot structure.

FIG. 2 includes diagrams 200 and 210 illustrating example aspects of slot structures that may be used for sidelink communication (e.g., between UEs 104, RSU, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may include 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include control information in PSCCH and some REs may include demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may include the data message described herein. The position of any of the data, DMRS, SCI, feedback, gap symbols, and/or LBT symbols may be different than the example illustrated in FIG. 2. Multiple slots may be aggregated together in some aspects.

Figure 3:
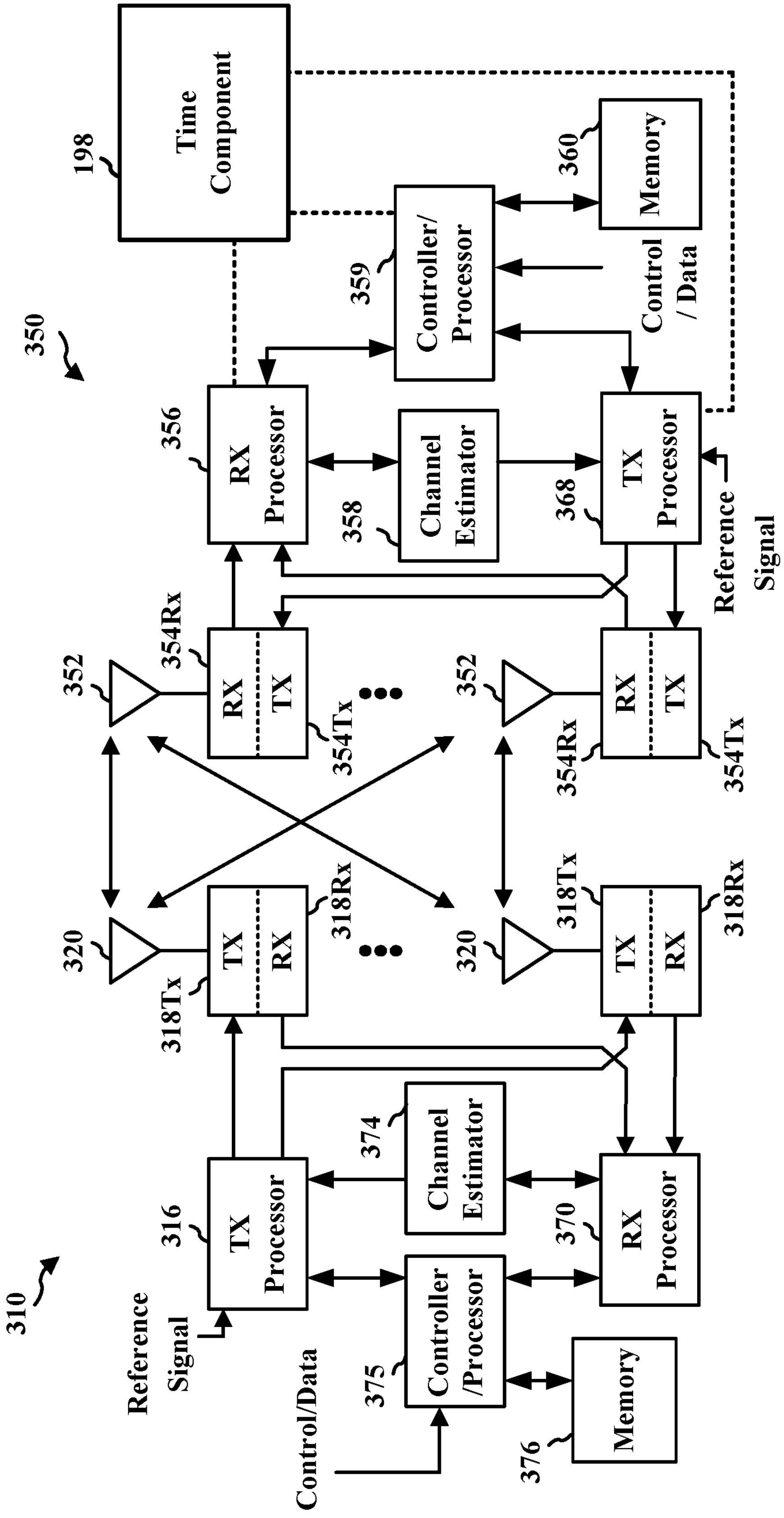
FIG. 3 is a diagram illustrating an example of a first device and a second device involved in wireless communication based, e.g., on sidelink.

FIG. 3 is a block diagram of a first wireless communication device 310 in communication with a second wireless communication device 350 based on sidelink. In some examples, the devices 310 and 350 may communicate based on V2X or other D2D communication. The communication may be based on sidelink using a PC5 interface. The devices 310 and the 350 may include a UE, an RSU, a base station, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318Tx. Each transmitter 318Tx may modulate an RF carrier with a respective spatial stream for transmission.

At the device 350, each receiver 354Rx receives a signal through its respective antenna 352. Each receiver recovers information modulated onto an RF carrier and provides the information to the receive (Rx) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The transmission is processed at the device 310 in a manner similar to that described in connection with the receiver function at the device 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, and the controller/processor 359 may be configured to perform aspects in connection with time component 198 of FIG. 1.

Figure 4:
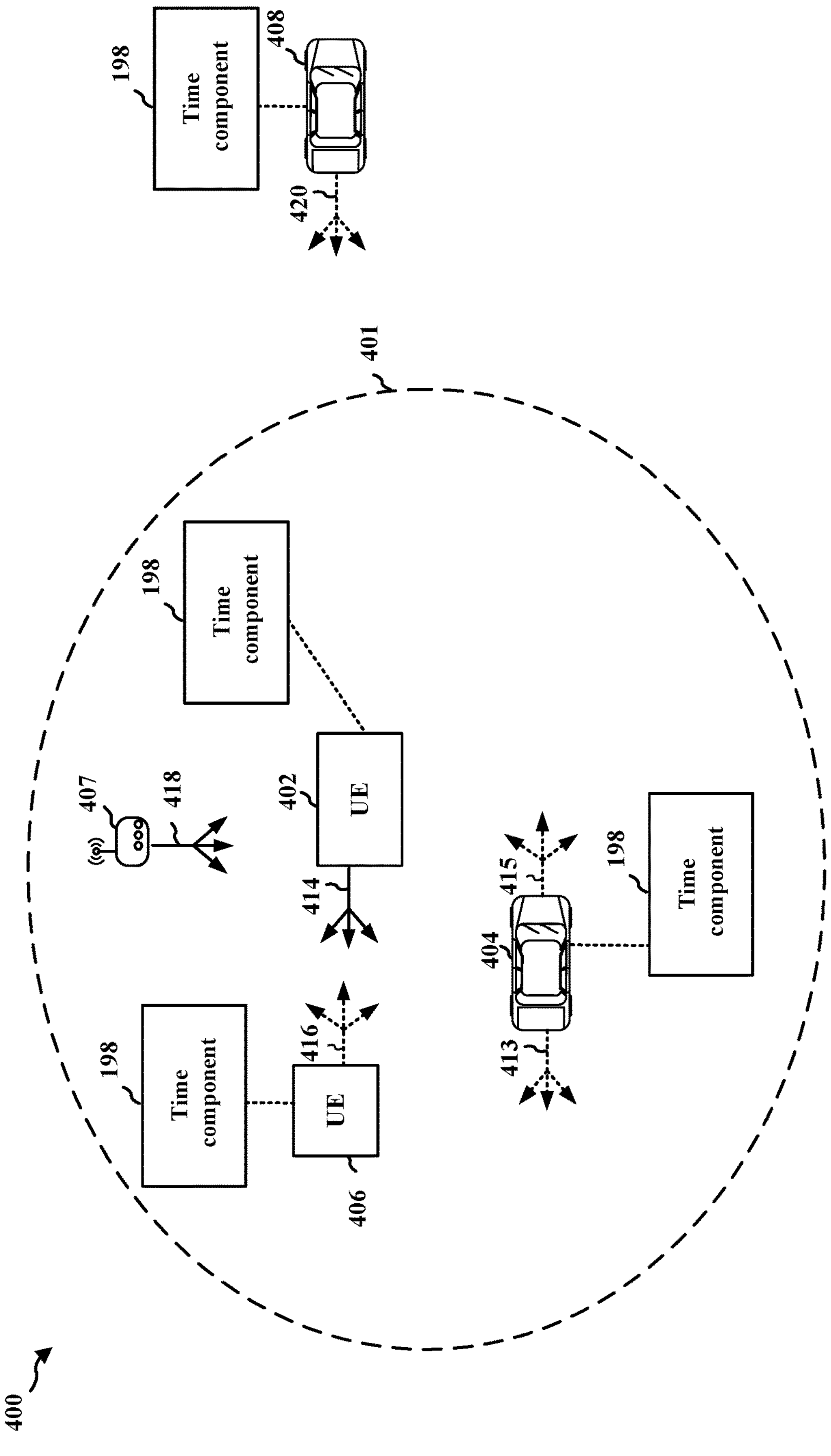
FIG. 4 illustrates an example of sidelink communication between devices.

FIG. 4 illustrates an example 400 of sidelink communication between devices. The communication may be based on a slot structure including aspects described in connection with FIG. 2. For example, the UE 402 may transmit a sidelink transmission 414, e.g., including a control channel (e.g., PSCCH) and/or a corresponding data channel (e.g., PSSCH), that may be received by UEs 404, 406, 408. A control channel may include information (e.g., sidelink control information (SCI)) for decoding the data channel including reservation information, such as information about time and/or frequency resources that are reserved for the data channel transmission. For example, the SCI may indicate a number of TTIs, as well as the RBs that will be occupied by the data transmission. The SCI may also be used by receiving devices to avoid interference by refraining from transmitting on the reserved resources. The UEs 402, 404, 406, 408 may each be capable of sidelink transmission in addition to sidelink reception. Thus, UEs 404, 406, 408 are illustrated as transmitting sidelink transmissions 413, 415, 416, 420. The sidelink transmissions 413, 414, 415, 416, 420 may be unicast, broadcast or multicast to nearby devices. For example, UE 404 may transmit transmissions 413, 415 intended for receipt by other UEs within a range 401 of UE 404, and UE 406 may transmit transmission 416. Additionally/alternatively, RSU 407 may receive communication from and/or transmit transmission 418 to UEs 402, 404, 406, 408. One or more of the UEs 402, 404, 406, 408 or the RSU 407 may include a time component 198 as described in connection with FIG. 1.

Sidelink communication may be based on different types or modes of resource allocation mechanisms. In a first resource allocation mode (which may be referred to herein as "Mode 1"), centralized resource allocation may be provided by a network entity. For example, a base station 102 may determine resources for sidelink communication and may allocate resources to different UEs 104 to use for sidelink transmissions. In this first mode, a UE receives the allocation of sidelink resources from the base station 102. In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. Devices communicating based on sidelink, may determine one or more radio resources in the time and frequency domain that are used by other devices in order to select transmission resources that avoid collisions with other devices. The sidelink transmission and/or the resource reservation may be periodic or aperiodic, where a UE may reserve resources for transmission in a current slot and up to two future slots (discussed below).

Thus, in the second mode (e.g., Mode 2), individual UEs may autonomously select resources for sidelink transmission, e.g., without a central entity such as a base station indicating the resources for the device. A first UE may reserve the selected resources in order to inform other UEs about the resources that the first UE intends to use for sidelink transmission(s).

In some examples, the resource selection for sidelink communication may be based on a sensing-based mechanism. For instance, before selecting a resource for a data transmission, a UE may first determine whether resources have been reserved by other UEs.

For example, as part of a sensing mechanism for resource allocation mode 2, the UE may determine (e.g., sense) whether the selected sidelink resource has been reserved by other UE(s) before selecting a sidelink resource for a data transmission. If the UE determines that the sidelink resource has not been reserved by other UEs, the UE may use the selected sidelink resource for transmitting the data, e.g., in a PSSCH transmission. The UE may estimate or determine which radio resources (e.g., sidelink resources) may be in-use and/or reserved by others by detecting and decoding sidelink control information (SCI) transmitted by other UEs. The UE may use a sensing-based resource selection algorithm to estimate or determine which radio resources are in-use and/or reserved by others. The UE may receive SCI from another UE that includes reservation information based on a resource reservation field included in the SCI. The UE may continuously monitor for (e.g., sense) and decode SCI from peer UEs. The SCI may include reservation information, e.g., indicating slots and RBs that a particular UE has selected for a future transmission. The UE may exclude resources that are used and/or reserved by other UEs from a set of candidate resources for sidelink transmission by the UE, and the UE may select/reserve resources for a sidelink transmission from the resources that are unused and therefore form the set of candidate resources. The UE may continuously perform sensing for SCI with resource reservations in order to maintain a set of candidate resources from which the UE may select one or more resources for a sidelink transmission. Once the UE selects a candidate resource, the UE may transmit SCI indicating its own reservation of the resource for a sidelink transmission. The number of resources (e.g., sub-channels per subframe) reserved by the UE may depend on the size of data to be transmitted by the UE. Although the example is described for a UE receiving reservations from another UE, the reservations may also be received from an RSU or other device communicating based on sidelink.

Figure 5:
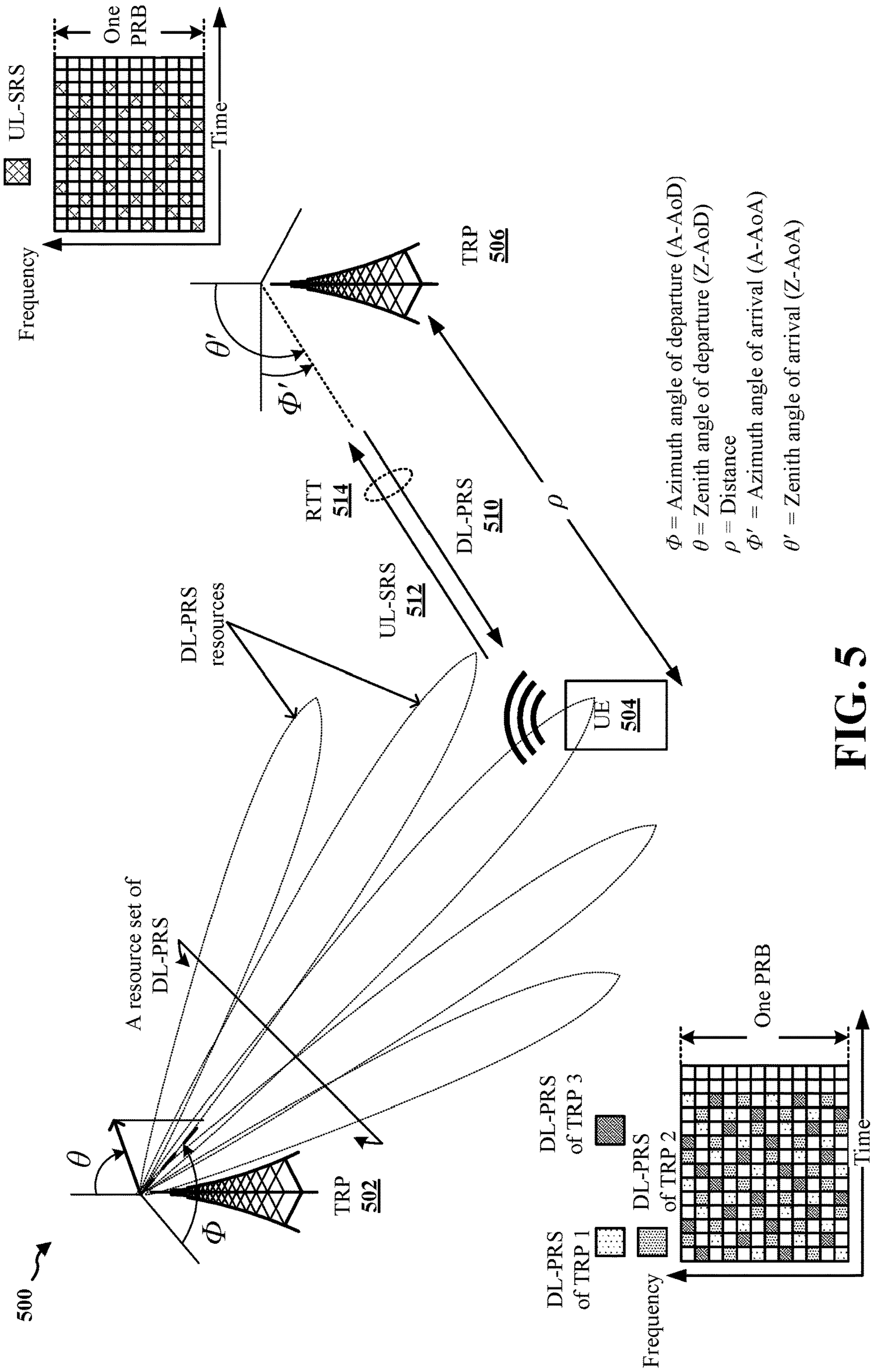
FIG. 5 is a diagram illustrating an example of user equipment (UE) positioning based on reference signal measurements.

FIG. 5 is a diagram 500 illustrating an example of a UE positioning based on reference signal measurements. The UE 504 may transmit UL-SRS 512 at time $T_{SRS\_TX}$ and receive DL positioning reference signals (PRS) (DL-PRS) 510 at time $T_{PRS\_RX}$. The TRP 506 may receive the UL-SRS 512 at time $T_{SRS\_RX}$ and transmit the DL-PRS 510 at time $T_{PRS\_TX}$. The UE 504 may receive the DL-PRS 510 before transmitting the UL-SRS 512, or may transmit the UL-SRS 512 before receiving the DL-PRS 510. In both cases, a positioning server (e.g., location server(s) 168) or the UE 504 may determine the RTT 514 based on $||T_{SRS\_RX}-T_{PRS\_TX}|-|T_{SRS\_TX}-T_{PRS\_RX}||$. Accordingly, multi-RTT positioning may make use of the UE Rx-Tx time difference measurements (i.e., $|T_{SRS\_TX}-T_{PRS\_RX}|$) and DL-PRS reference signal received power (RSRP) (DL-PRS-RSRP) of downlink signals received from multiple TRPs 502, 506 and measured by the UE 504, and the measured TRP Rx-Tx time difference measurements (i.e., $|T_{SRS\_RX}-T_{PRS\_TX}|$) and UL-SRS-RSRP at multiple TRPs 502, 506 of uplink signals transmitted from UE 504. The UE 504 measures the UE Rx-Tx time difference measurements (and optionally DL-PRS-RSRP of the received signals) using assistance data received from the positioning server, and the TRPs 502, 506 measure the gNB Rx-Tx time difference measurements (and optionally UL-SRS-RSRP of the received signals) using assistance data received from the positioning server. The measurements may be used at the positioning server or the UE 504 to determine the RTT, which is used to estimate the location of the UE 504. Other methods are possible for determining the RTT, such as for example using DL-TDOA and/or UL-TDOA measurements.

DL-AoD positioning may make use of the measured DL-PRS-RSRP of downlink signals received from multiple TRPs 502, 506 at the UE 504. The UE 504 measures the DL-PRS-RSRP of the received signals using assistance data received from the positioning server, and the resulting measurements are used along with the azimuth angle of departure (A-AoD), the zenith angle of departure (Z-AoD), and other configuration information to locate the UE 504 in relation to the neighboring TRPs 502, 506.

DL-TDOA positioning may make use of the DL reference signal time difference (RSTD) (and optionally DL-PRS-RSRP) of downlink signals received from multiple TRPs 502, 506 at the UE 504. The UE 504 measures the DL RSTD (and optionally DL-PRS-RSRP) of the received signals using assistance data received from the positioning server, and the resulting measurements are used along with other configuration information to locate the UE 504 in relation to the neighboring TRPs 502, 506.

UL-TDOA positioning may make use of the UL relative time of arrival (RTOA) (and optionally UL-SRS-RSRP) at multiple TRPs 502, 506 of uplink signals transmitted from UE 504. The TRPs 502, 506 measure the UL-RTOA (and optionally UL-SRS-RSRP) of the received signals using assistance data received from the positioning server, and the resulting measurements are used along with other configuration information to estimate the location of the UE 504.

UL-AoA positioning may make use of the measured azimuth angle of arrival (A-AoA) and zenith angle of arrival (Z-AoA) at multiple TRPs 502, 506 of uplink signals transmitted from the UE 504. The TRPs 502, 506 measure the A-AoA and the Z-AoA of the received signals using assistance data received from the positioning server, and the resulting measurements are used along with other configuration information to estimate the location of the UE 504.

Additional positioning methods may be used for estimating the location of the UE 504, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

A vehicle may enter a GNSS denied environment where a GNSS signal is not available for the vehicle. As used herein, the term "GNSS denied environment" may refer to an environment in the physical world where GNSS signal is not available for the vehicle, such as a tunnel where GNSS signal is not available for the vehicle, a parking lot or garage where GNSS signal is not available for the vehicle, another environment where GNSS signal is not available for the vehicle, an environment that the vehicle might be in during a GNSS system outage, or the like. In such an environment, the vehicle may not have the GNSS signal available as a time source to determine the current time (e.g., UTC time). An environment where GNSS signal is available for the vehicle may be referred to as a "GNSS enabled environment." As used herein, the term "time source," "timing source," or "source" may be a wireless device, such as another vehicle or a RSU where the vehicle may determine a current time (e.g., the current UTC time) based on receiving and decoding messages from the source. The current time may be used for positioning activity, a timing maintenance activity, or a communication activity. As used herein, the term "positioning activity" may refer to positioning performed to determine the position or location associated with the vehicle or another vehicle inside a GNSS denied environment, a GNSS enabled environment, when the vehicle moves from the GNSS denied environment to the GNSS enabled environment or vice versa. As used herein, the term "timing maintenance activity" may refer to the activity of keeping track of a current time to facilitate other activities in a GNSS denied environment. As used herein, the term "communication activity" may refer to transmission of messages or reception and decoding of messages.

In some wireless communication systems, inside a GNSS denied environment, a time uncertainty (TUNC) for GNSS may be keep growing. For an OBU associated with a vehicle may not be able to transmit V2X messages for SLSS if a UTC time uncertainty is greater than one millisecond (e.g., the vehicle is uncertain about the current UTC time by more than one millisecond). To enable transmission of V2X messages, an OBU may synchronize with a RSU inside the GNSS denied environment (e.g., via SLSS) and use the RSU as a time source. In other words, coarse UTC time received from various infrastructure-to-vehicle (12V) messages may be injected to communications associated with the vehicle. In such an implementation, if the RSU has an inaccurate UTC time, the RSU may be broadcasting invalid UTC time information (e.g., wrong) via I2V messages to vehicles inside the GNSS denied environment and such invalid UTC time information may be obtained by OBUs inside the GNSS denied environment. By obtaining an invalid UTC time information, the OBUs inside the GNSS denied environment may have various issues. As used herein, the term "sidelink message" may refer to V2X messages, V2I messages, I2V messages, or other messages transmitted via sidelink.

As a first example, when the vehicle moves out from a GNSS denied environment, the vehicle may determine its position based on resynchronizing with the GNSS system (e.g., receiving GNSS signal after not receiving GNSS signal for a period of time). A larger uncertainty or error regarding the current time may result in longer resynchronizing time or a less accurate initial estimate. The inaccurate time may lead to a longer search window for GNSS space vehicle (SV) measurements leading to higher time to first fix (TTFF) when the vehicle moves to a GNSS enabled environment. The term "TTFF" may refer to a time period between a first time when a GNSS unit is turned on and a second time when the GNSS unit is able to output a valid navigation solution with a performance level above a threshold. A larger uncertainty or error regarding the current time may also result in increased acquisition power because more resources may be deployed to detect signal in the GNSS denied environment. A larger uncertainty or error regarding the current time may also result in more GNSS robustness issues and wrong UTC time injection may lead to incorrect bit-edge detection, data decoding errors, or position accuracy degradation. The term "bit-edge detection" may refer to a process of determining a data bit boundary (also referred to as a data bit edge). The process may be a two-step procedure. In the first step, initial boundaries at the meander encoded transition rate may be determined. The initial boundaries may be at a rate different from the rate of the information data bits. The initial boundaries may both (1) separate neighboring data bits and (2) divide each meander encoded data bit in half. In the second step, the initial boundaries may be analyzed to distinguish (1) data bit boundaries separating neighboring data bits from (2) meander encoded center transitions that divide each bit in half. As an example, a window spanning 20 meander encoded data samples at a rate of 1 sample/ms has 20 corresponding possible starting points. First, an initial boundary starting point (or phase) is determined with a 10-ms spacing (100-Hz data rate), then second, a data bit boundary starting point (data bit edge) may be determined with a 20-ms spacing (50 Hz data rate). Once the receiving device determines a starting point, the device may remove the meander code and interpret the received data samples.

Aspects provided herein may enable determining a more accurate current time in a GNSS denied environment for facilitating positioning activity, a timing maintenance activity, or a communication activity. Aspects provided herein may lead to less V2X Rx/Tx packet retransmission or decode issue due to wrong or uncertain UTC time information. Aspects provided herein may also lead to less time to converge (shorter TTFF) for a GNSS fix (e.g., while moving from a GNSS denied environment to a GNSS enabled environment). Aspects provided herein may also lead to less power consumption. Aspects provided herein may also lead to a better estimate of vehicle location of other vehicles transmitted via basic safety messages (BSM). Aspects provided herein may also lead to more accurate generation of BSM due to the time included in the BSM being more likely to be correct. Aspects provided herein may include determining a suspicious time source so that the vehicle may not use the suspicious time source as a time source. As used herein, the term "suspicious time source" may refer to a time source where the time information (e.g., UTC time) determined by the suspicious time source may be evaluated as (e.g., determined by another device to be) potentially wrong. During GNSS outage (e.g., tunnel, parking lot or garage) GNSS TUNC keeps growing. If OBU is in SLSS mode, intelligent transport system (ITS) cannot generate V2V message if UTC time uncertainty is larger than a threshold (e.g., 1 millisecond). Furthermore, a rogue RSU broadcasting invalid UTC time may lead to wrong timing info injected in OBU. In some aspects, the ITS stack may determine a metric to choose best UTC time from received I2V/V2V messages, including: distance travelled within tunnel, time since tunnel entry or GNSS denied environment, map aiding, real time traffic insight inside the tunnel.

Figure 6:
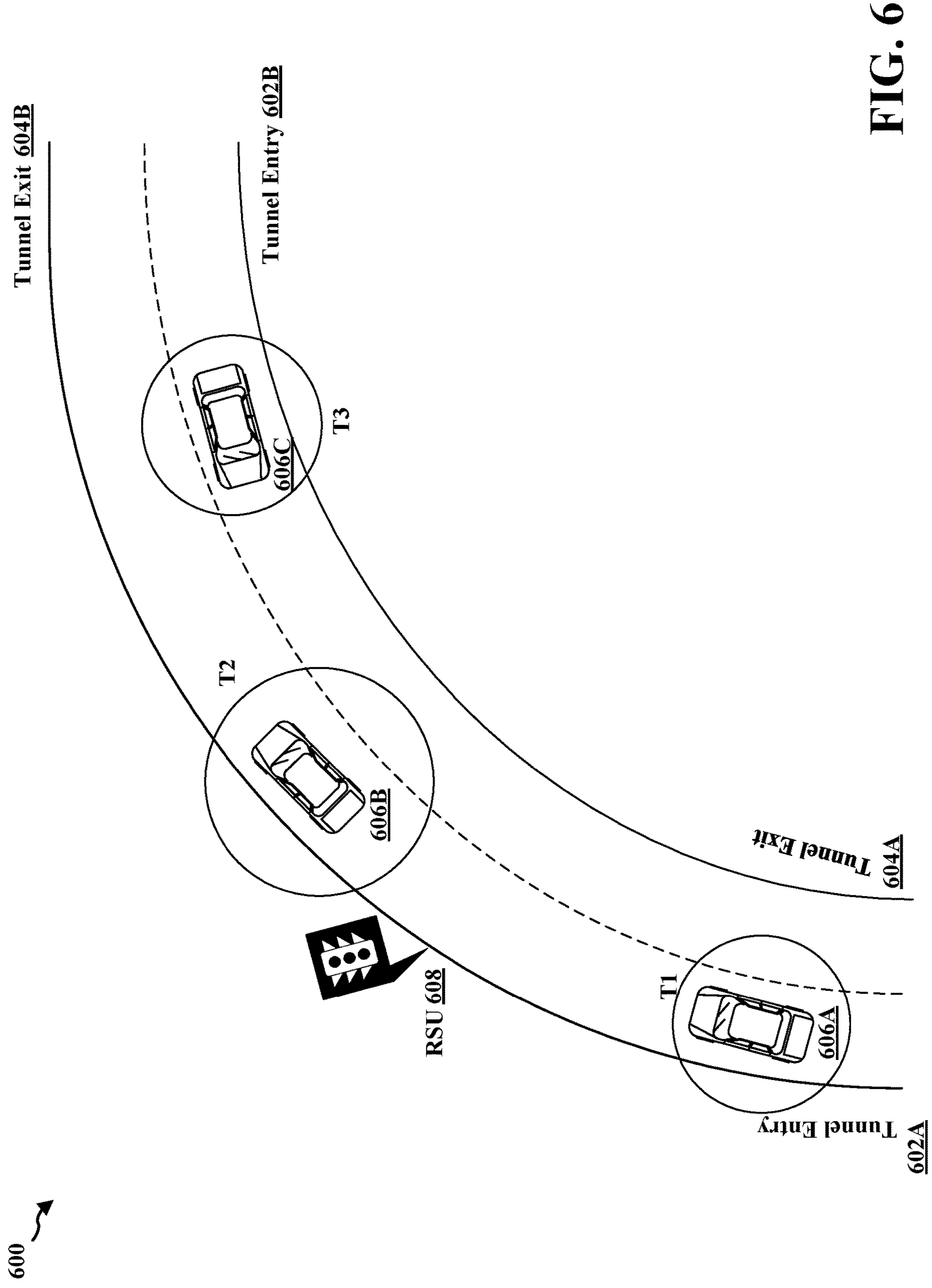
FIG. 6 is a diagram illustrating several vehicles and a road-side-unit (RSU) operating inside an example global navigation satellite system (GNSS) denied environment.

FIG. 6 is a diagram 600 illustrating several vehicles and a RSU operating inside an example GNSS denied environment. Within the GNSS denied environment, GNSS signal may not be available for vehicles, RSUs, or other wireless devices within the GNSS environment. As illustrated in FIG. 6, a GNSS denied environment may be a tunnel with a first tunnel entry 602A and a second tunnel entry 602B. The tunnel may also include a first tunnel exit 604A and a second tunnel exit 604B. Within the tunnel, there may be a first vehicle 606A, a second vehicle 606B, and a third vehicle 606C. Each of the first vehicle 606A, the second vehicle 606B, and the third vehicle 606C, may respectively include an OBU. Each of the first vehicle 606A, the second vehicle 606B, and the third vehicle 606C, may respectively maintain (e.g., keep track of) a respective UTC time (T1, T2, and T3). Each of the first vehicle 606A, the second vehicle 606B, and the third vehicle 606C may be operating in an SLSS mode and may respectively receive I2V (infrastructure-to-vehicle) or V2V (vehicle-to-vehicle) messages. For example, the first vehicle 606A may receive V2V message from the second vehicle 606B, the third vehicle 606C, and I2V message from a RSU 608. The second vehicle 606B may receive V2V message from the first vehicle 606A, the third vehicle 606C, and I2V message from the RSU 608. The third vehicle 606C may receive V2V message from the first vehicle 606A, the second vehicle 606B and I2V message from the RSU 608. The RSU 608 may exchange sidelink messages with the first vehicle 606A, the second vehicle 606B, and the third vehicle 606C. As each of the first vehicle 606A, the second vehicle 606B, and the third vehicle 606C receive sidelink messages from each other and from the RSU 608, each of the first vehicle 606A, the second vehicle 606B, and the third vehicle 606C may decode position and time information from the received sidelink messages. Based on the decoded time information, each of the first vehicle 606A, the second vehicle 606B, and the third vehicle 606C may determine (e.g., or verify) a current time (e.g., current UTC time) by determining (e.g., selecting) a time source among the other vehicles or the RSU. In some aspects, the first vehicle 606A, the second vehicle 606B, and the third vehicle 606C may select a time source based on a respective distance traveled within the GNSS denied environment associated with the time source (e.g., based on path history), a respective time inside the GNSS denied environment associated with the time source, or sensor data associated with the wireless device.

In some aspects, the first vehicle 606A, the second vehicle 606B, and the third vehicle 606C may select another vehicle as the time source based on a sidelink message from the vehicle indicates a relatively most recent entry to the GNSS denied environment. For example, the second vehicle 606B may receive a sidelink message from the first vehicle 606A, a sidelink message from the third vehicle 606C, and a sidelink message from the RSU 608. The sidelink message from the first vehicle 606A may indicate a time associated with entry to the GNSS denied environment that may be larger than a time associated with entry to the GNSS denied environment in a sidelink message from the third vehicle 606C. In some aspects, based on the time associated with entry to the GNSS denied environment in the sidelink message from the first vehicle 606A being larger than the time associated with entry to the GNSS denied environment in a sidelink message from the third vehicle 606C, the second vehicle 606B may select the third vehicle 606C as the time source. In some aspects, a distance travelled after entry to the GNSS denied environment indicated in the sidelink message from the first vehicle 606A may be larger than a distance travelled after entry to the GNSS denied environment indicated in the sidelink message from the third vehicle 606C. In some aspects, based on the distance travelled after entry to the GNSS denied environment indicated in the sidelink message from the first vehicle 606A being larger than a distance travelled after entry to the GNSS denied environment indicated in the sidelink message from the third vehicle 606C, the second vehicle 606B may select the third vehicle 606C as the time source. In some aspects, the second vehicle 606B may select a vehicle that travelled within the GNSS denied environment for less than a time threshold or less than a distance threshold as a time source.

In some aspects, the second vehicle 606B may not select a vehicle that travelled within the GNSS denied environment for more than a time threshold or more than a distance threshold as a time source. In some aspects, a vehicle may consider various different information as factors when determining a time source including: (1) distance travelled within the GNSS denied environment (e.g., using path history), (2) time in the GNSS denied environment, (3) map aiding, or (4) real time traffic insight inside the GNSS denied environment.

In some aspects, a vehicle may determine a time source as a suspicious time source based on the time broadcasted by the time source being different from other time determined based on sidelink messages. For example, if the second vehicle 606B receives a sidelink message from the RSU 608, based on a current location of the second vehicle, a receipt time associated with the sidelink message, a propagation delay calculated based on the current location of the second vehicle 606B, and a time included in the sidelink message, the second vehicle 606B may determine that the RSU 608 is a suspicious time source. In some aspects, a vehicle may not select a suspicious time source as the time source. In some aspects, if the suspicious time source is a RSU (e.g., the RSU 608) a vehicle may notify the suspicious time source or the other vehicles in the channel that the RSU may be broadcasting wrong time. In some aspects, after selecting the time source, the second vehicle 606B may perform positioning activity, a timing maintenance activity, or a communication activity based on a current time.

Figure 7:
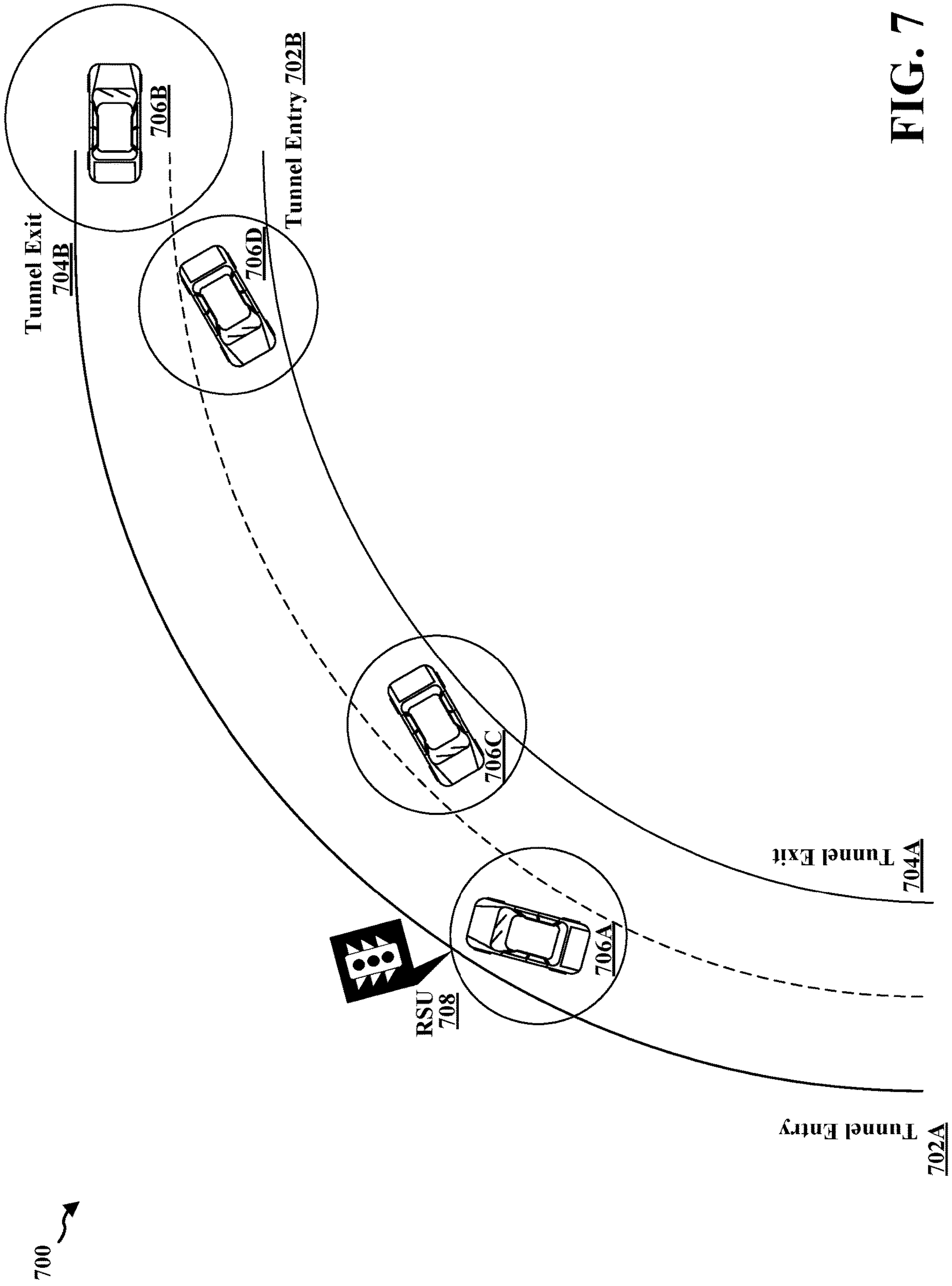
FIG. 7 is a diagram illustrating several vehicles and a RSU operating inside an example GNSS denied environment.

FIG. 7 is a diagram 700 illustrating several vehicles and a RSU operating inside an example GNSS denied environment. Within the GNSS denied environment, the GNSS signal may not be available for vehicles, RSUs, or other wireless devices within the GNSS environment. As illustrated in FIG. 7, a GNSS denied environment may be a tunnel with a first tunnel entry 702A and a second tunnel entry 702B. The tunnel may also include a first tunnel exit 704A and a second tunnel exit 704B. Within the tunnel, there may be a first vehicle 706A, a second vehicle 706B, and a third vehicle 706C. Each of the first vehicle 706A, the second vehicle 706B, and the third vehicle 706C, may respectively include an OBU. Each of the first vehicle 706A, the second vehicle 706B, and the third vehicle 706C, may respectively maintain (e.g., keep track of) a respective UTC time (T1, T2, and T3). Each of the first vehicle 706A, the second vehicle 706B, and the third vehicle 706C may be operating in an SLSS mode and may respectively receive I2V (infrastructure-to-vehicle) or V2V (vehicle-to-vehicle) messages. For example, the first vehicle 706A may receive V2V message from the second vehicle 706B, the third vehicle 706C, and I2V message from a RSU 708. The second vehicle 706B may receive V2V message from the first vehicle 706A, the third vehicle 706C, and I2V message from the RSU 708. The third vehicle 706C may receive V2V message from the first vehicle 706A, the second vehicle 706B and I2V message from the RSU 708. The RSU 708 may exchange sidelink messages with the first vehicle 706A, the second vehicle 706B, and the third vehicle 706C. As each of the first vehicle 706A, the second vehicle 706B, and the third vehicle 706C receive sidelink messages from each other and from the RSU 708, each of the first vehicle 706A, the second vehicle 706B, and the third vehicle 706C may decode position and time information from the received sidelink messages. Based on the decoded time information, each of the first vehicle 706A, the second vehicle 706B, and the third vehicle 706C may determine (e.g., or verify) a current time (e.g., current UTC time) by determining (e.g., selecting) a time source among the other vehicles or the RSU. In some aspects, the first vehicle 706A, the second vehicle 706B, and the third vehicle 706C may select a time source based on a respective distance traveled within the GNSS denied environment associated with the time source (e.g., based on path history), a respective time inside the GNSS denied environment associated with the time source, or sensor data associated with the wireless device. In some aspects, the first vehicle 706A, the second vehicle 706B, and the third vehicle 706C correspond to the first vehicle 606A, the second vehicle 606B, and the third vehicle 606C.

As illustrated in FIG. 7, there may be another vehicle 706D that recently entered the GNSS denied environment. Based on the vehicle 706D being the most recently entered vehicle, the first vehicle 706A, the second vehicle 706B, and the third vehicle 706C may select the vehicle 706D as the time source. The second vehicle 706B may be exiting the GNSS denied environment via the tunnel exit 704B and may be using a current time broadcasted by the vehicle 706D to synchronize with the GNSS system (e.g., receiving GNSS signal) after exiting the GNSS denied environment.

Figure 8:
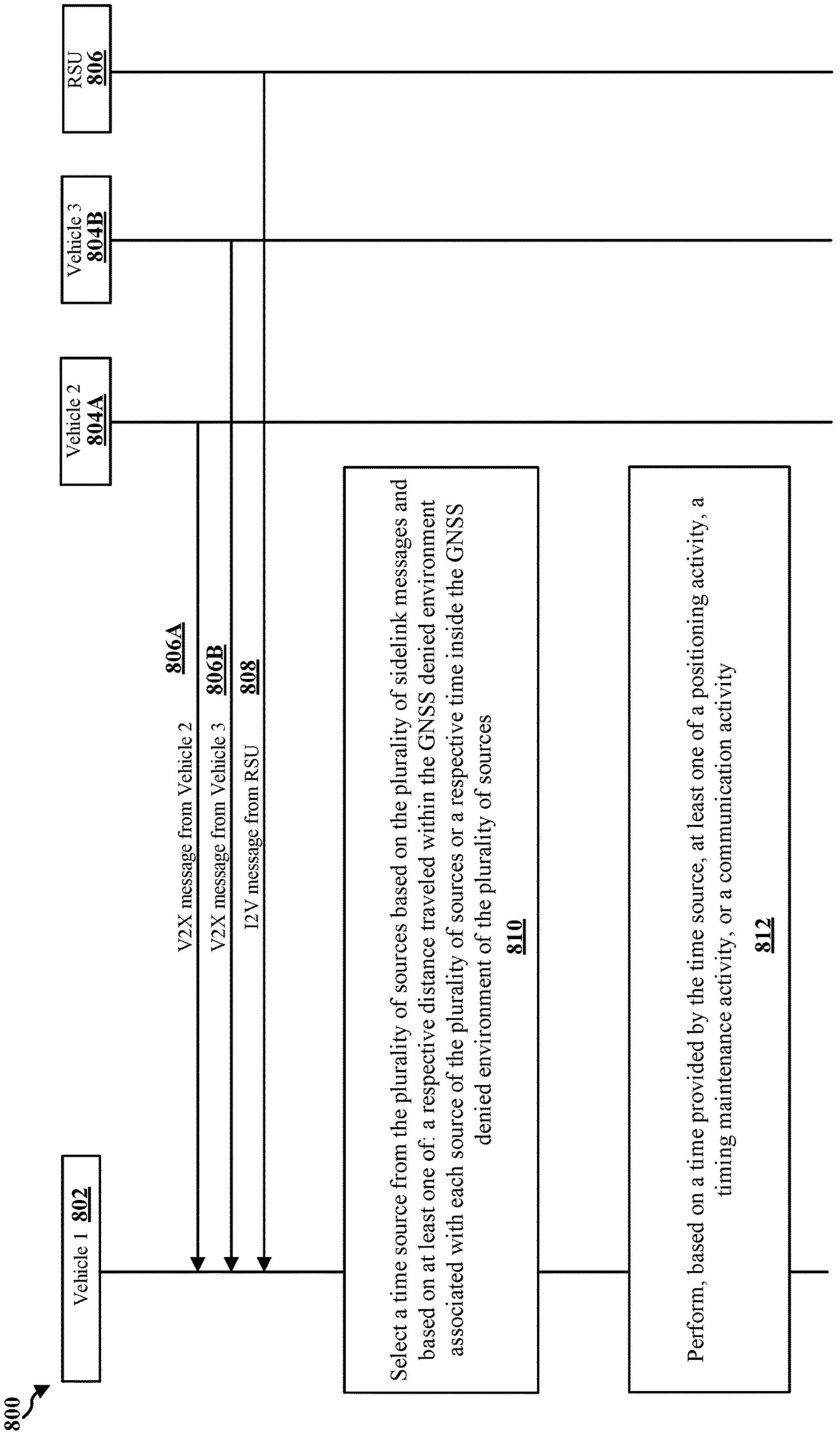
FIG. 8 is a diagram illustrating example communications between vehicles and a RSU.

FIG. 8 is a diagram 800 illustrating example communications between vehicles and a RSU. As illustrated in FIG. 8, a vehicle 802 may receive one or more sidelink messages from multiple time sources including a second vehicle 804A, a third vehicle 804B, and a RSU 806. The vehicle 802 may receive a V2X message 806A from the second vehicle 804A, a V2X message 806B from the third vehicle 804B, and an I2V 808 message from the RSU 806. Based on the received messages, at 810, the first vehicle 802 may select a time source from the second vehicle 804A, a third vehicle 804B, and a RSU 806 based on the V2X message 806A from the second vehicle 804A, the V2X message 806B from the third vehicle 804B, and the I2V 808 message from the RSU 806 and based on at least one of: a respective distance traveled within the GNSS denied environment or a respective time inside the GNSS denied environment of the plurality of sources. The first vehicle 802 may also consider the respective distance traveled within the GNSS denied environment, the respective time inside the GNSS denied environment, a respective path history, or sensor data. The first vehicle 802 may identify a suspicious time source and refrain from selecting the suspicious time source based on the identification refrain from selecting the suspicious time source based on the identification. In some aspects, if the suspicious time source is the RSU 806, the first vehicle may notify the RSU 806 about a time broadcasted by the RSU 806 being potentially wrong. In some aspects, at 812, the first vehicle 802 may perform, based on a time provided by the time source, at least one of a positioning activity, a timing maintenance activity, or a communication activity.

Figure 9:
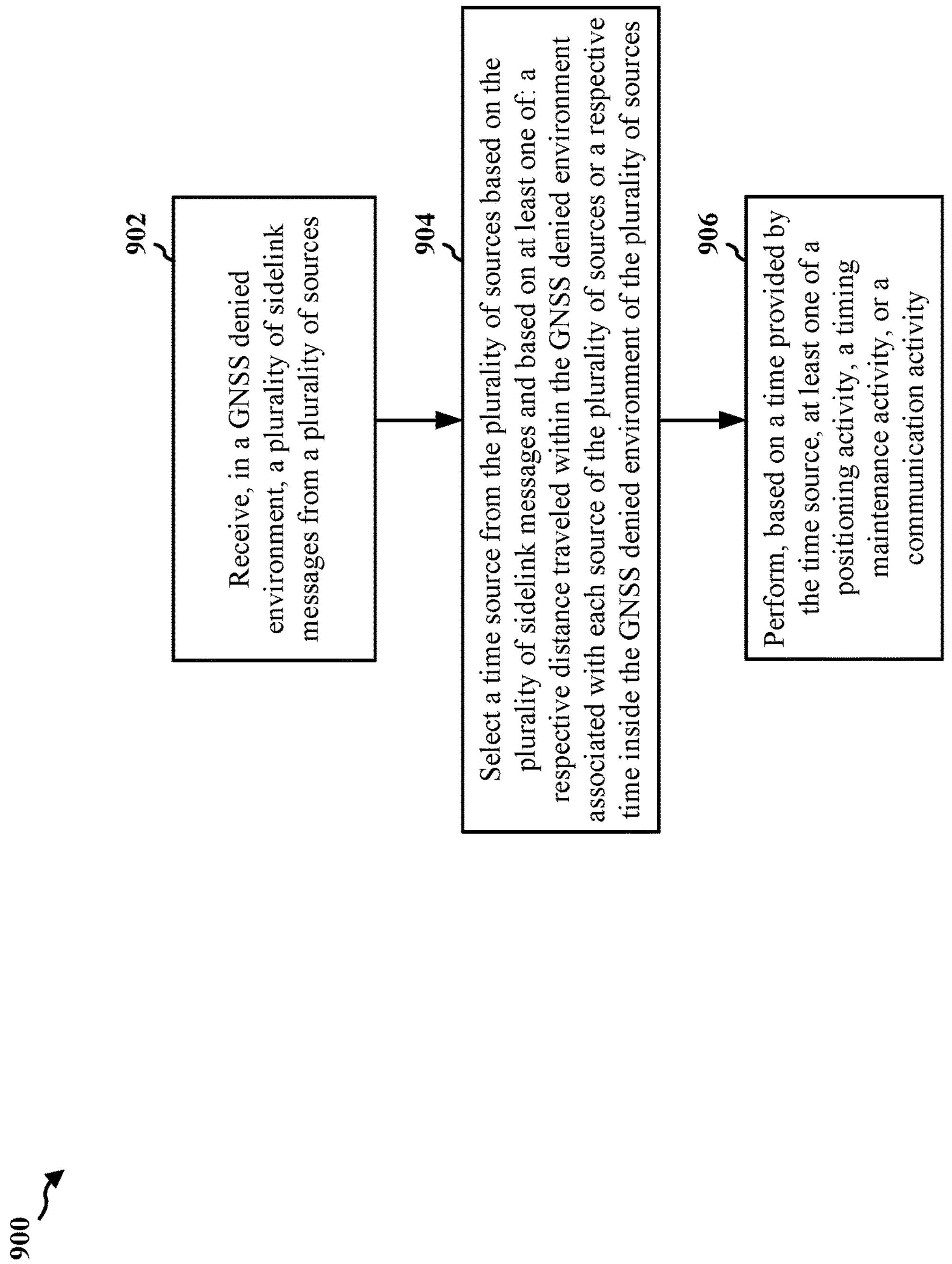
FIG. 9 is a flowchart of a method of wireless communication.

FIG. 9 is a flowchart 900 of a method of wireless communication. The method may be performed by a wireless device (e.g., the UE 104, the vehicle 606A, the vehicle 606B, the vehicle 606C, the vehicle 706A, the vehicle 706B, the vehicle 706C, the vehicle 706D, the vehicle 802 or an OBU associated with the vehicle 802; the apparatus 1004).

At 902, the wireless device may receive, in a GNSS denied environment, a plurality of sidelink messages from a plurality of sources. In some aspects, the wireless device is an OBU associated with a vehicle. For example, the vehicle 802 may receive, in a GNSS denied environment, a plurality of sidelink messages (e.g., 806A, 806B, or 808) from a plurality of sources (e.g., 804A, 804B, or 806). In some aspects, 902 may be performed by time component 198. In some aspects, the GNSS denied environment is an environment where a GNSS signal is not available for the wireless device.

At 904, the wireless device may select a time source from the plurality of sources based on the plurality of sidelink messages and based on at least one of: a respective distance traveled within the GNSS denied environment associated with each source of the plurality of sources or a respective time inside the GNSS denied environment of the plurality of sources. For example, the vehicle 802 may select (e.g., at 810) a time source from the plurality of sources based on the plurality of sidelink messages and based on at least one of: a respective distance traveled within the GNSS denied environment associated with each source of the plurality of sources or a respective time inside the GNSS denied environment of the plurality of sources. In some aspects, 904 may be performed by time component 198. In some aspects, to select the time source, the wireless device may select the time source from the plurality of sources based on the plurality of sidelink messages and based on at least one of: the respective distance traveled within the GNSS denied environment, the respective time inside the GNSS denied environment, a respective path history, or sensor data associated with the wireless device.

In some aspects, the wireless device may identify a suspicious time source from the plurality of sources based on the plurality of sidelink messages and based on a first time broadcasted by the suspicious time source being different from a second time broadcasted by a set of other sources of the plurality of sources. In some aspects, the wireless device may refrain from selecting the suspicious time source based on the identification. In some aspects, the suspicious time source is an OBU associated with a vehicle or a RSU. In some aspects, if the suspicious time source is the RSU, the wireless device may transmit, to the suspicious time source or at least one other wireless device, information regarding the suspicious time source being potentially inaccurate.

In some aspects, to select the time source, the wireless device may select the time source based on a distance traveled within the GNSS denied environment associated with the time source being less than a distance threshold. In some aspects, to select the time source, the wireless device may select the time source based on a time inside the GNSS denied environment associated with the time source being less than a time threshold.

At 906, the wireless device may perform, based on a time provided by the time source, at least one of a positioning activity, a timing maintenance activity, or a communication activity. For example, the vehicle 802 may perform (e.g., at 812), based on a time provided by the time source, at least one of a positioning activity, a timing maintenance activity, or a communication activity. In some aspects, 906 may be performed by time component 198.

In some aspects, to perform the positioning activity, the wireless device may determine, using the time provided by the time source, a position associated with the wireless device or a second wireless device. In some aspects, to perform the timing maintenance activity, the wireless device may refrain from adjusting the time provided by the time source until the wireless devices leaves the GNSS denied environment or enters a GNSS enabled environment and determine, based on receiving a GNSS signal, a position associated with the wireless device using the time provided by the time source. In some aspects, to perform the communication activity, the wireless device may decode, using the time provided by the time source, one or more V2X messages or transmit using the time provided by the time source, one or more V2X messages.

In some aspects, the wireless device may output an indication of at least one of the performed positioning activity, the performed timing maintenance activity, or the performed communication activity. In some aspects, to output the indication of at least one of the performed positioning activity, the performed timing maintenance activity, or the performed communication activity, the wireless device may transmit the indication of at least one of the performed positioning activity, the performed timing maintenance activity, or the performed communication activity or store the indication of at least one of the performed positioning activity, the performed timing maintenance activity, or the performed communication activity.

Figure 10:
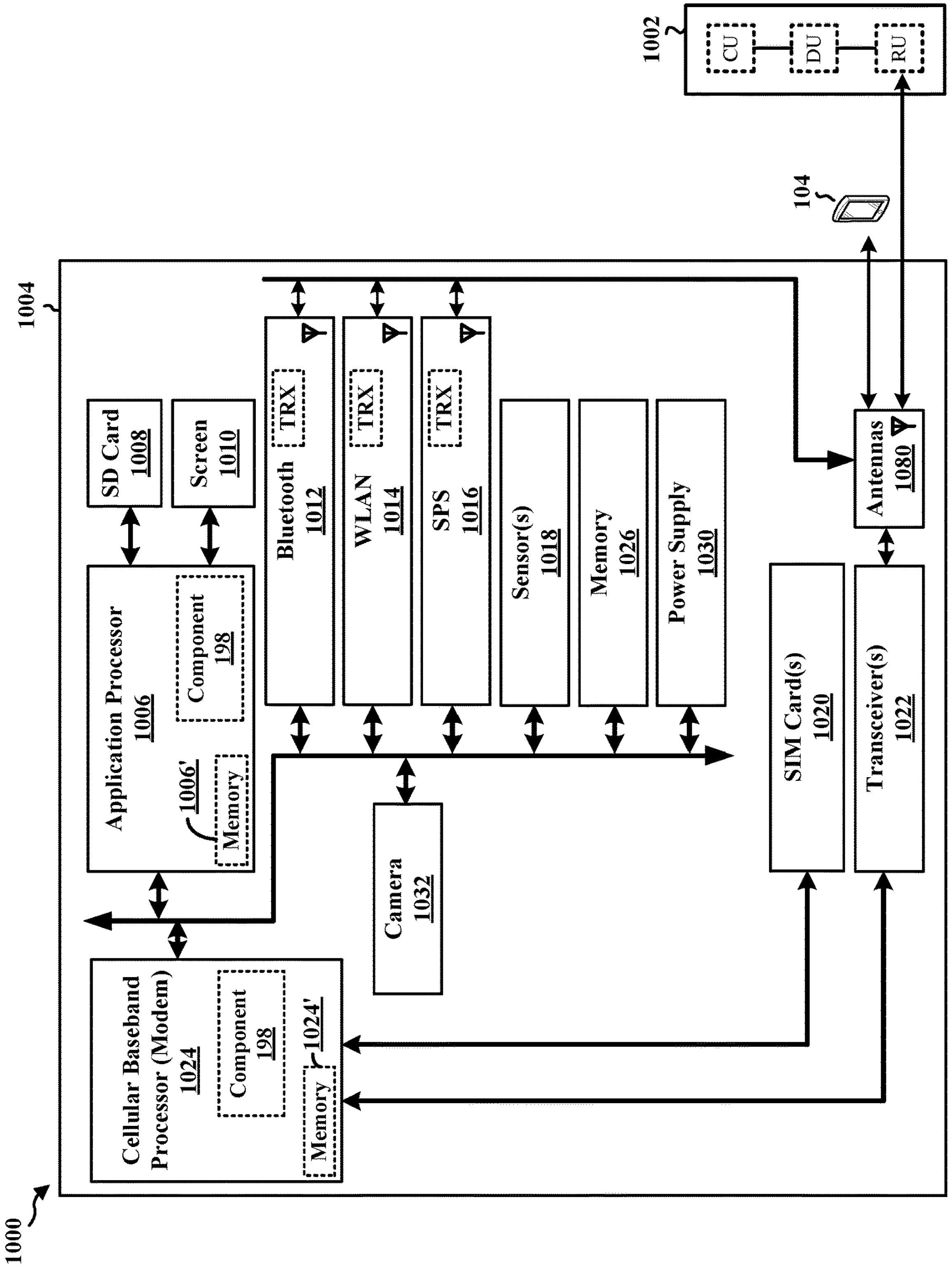
FIG. 10 is a diagram illustrating an example of a hardware implementation for an example apparatus and/or network entity.

FIG. 10 is a diagram 1000 illustrating an example of a hardware implementation for an apparatus 1004. The apparatus 1004 may be a UE, a component of a UE, or may implement UE functionality. In some aspects, the apparatus 1004 may include at least one cellular baseband processor 1024 (also referred to as a modem) coupled to one or more transceivers 1022 (e.g., cellular RF transceiver). The cellular baseband processor(s) 1024 may include at least one on-chip memory 1024'. In some aspects, the apparatus 1004 may further include one or more subscriber identity modules (SIM) cards 1020 and at least one application processor 1006 coupled to a secure digital (SD) card 1008 and a screen 1010. The application processor(s) 1006 may include on-chip memory 1006'. In some aspects, the apparatus 1004 may further include a Bluetooth module 1012, a WLAN module 1014, an SPS module 1016 (e.g., GNSS module), one or more sensor modules 1018 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1026, a power supply 1030, and/or a camera 1032. The Bluetooth module 1012, the WLAN module 1014, and the SPS module 1016 may include an on-chip transceiver (TRX) (or in some cases, just a receiver (RX)). The Bluetooth module 1012, the WLAN module 1014, and the SPS module 1016 may include their own dedicated antennas and/or utilize the antennas 1080 for communication. The cellular baseband processor(s) 1024 communicates through the transceiver(s) 1022 via one or more antennas 1080 with the UE 104 and/or with an RU associated with a network entity 1002. The cellular baseband processor(s) 1024 and the application processor(s) 1006 may each include a computer-readable medium/memory 1024', 1006', respectively. The additional memory modules 1026 may also be considered a computer-readable medium/memory. Each computer-readable medium/memory 1024', 1006', 1026 may be non-transitory. The cellular baseband processor(s) 1024 and the application processor(s) 1006 are each responsible for general processing, including the execution of software stored on the computer-readable medium/memory. The software, when executed by the cellular baseband processor(s) 1024/application processor(s) 1006, causes the cellular baseband processor(s) 1024/application processor(s) 1006 to perform the various functions described supra. The computer-readable medium/memory may also be used for storing data that is manipulated by the cellular baseband processor(s) 1024/application processor(s) 1006 when executing software. The cellular baseband processor(s) 1024/application processor (s) 1006 may be a component of the device 350 and may include the at least one memory 360 and/or at least one of the TX processor 368, the RX processor 356, and the controller/processor 359. In one configuration, the apparatus 1004 may be at least one processor chip (modem and/or application) and include just the cellular baseband processor(s) 1024 and/or the application processor(s) 1006, and in another configuration, the apparatus 1004 may be the entire UE (e.g., see device 350 of FIG. 3) and include the additional modules of the apparatus 1004.

As discussed supra, the time component 198 may be configured to receive, in a GNSS denied environment, a plurality of sidelink messages from a plurality of sources. In some aspects, the time component 198 may be configured to select a time source from the plurality of sources based on the plurality of sidelink messages and based on at least one of: a respective distance traveled within the GNSS denied environment associated with each source of the plurality of sources or a respective time inside the GNSS denied environment of the plurality of sources. In some aspects, the time component 198 may be configured to perform, based on a time provided by the time source, at least one of a positioning activity, a timing maintenance activity, or a communication activity. The time component 198 may be within the cellular baseband processor(s) 1024, the application processor(s) 1006, or both the cellular baseband processor(s) 1024 and the application processor(s) 1006. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1004 may include a variety of components configured for various functions. In one configuration, the apparatus 1004, and in particular the cellular baseband processor(s) 1024 and/or the application processor(s) 1006, may include means for receiving, in a GNSS denied environment, a plurality of sidelink messages from a plurality of sources. In some aspects, the apparatus 1004 may include means for selecting a time source from the plurality of sources based on the plurality of sidelink messages and based on at least one of: a respective distance traveled within the GNSS denied environment associated with each source of the plurality of sources or a respective time inside the GNSS denied environment of the plurality of sources. In some aspects, the apparatus 1004 may include means for performing, based on a time provided by the time source, at least one of a positioning activity, a timing maintenance activity, or a communication activity. In some aspects, the apparatus 1004 may include means for selecting the time source from the plurality of sources based on the plurality of sidelink messages and based on at least one of: the respective distance traveled within the GNSS denied environment, the respective time inside the GNSS denied environment, a respective path history, or sensor data associated with the wireless device. In some aspects, the apparatus 1004 may include means for identifying a suspicious time source from the plurality of sources based on the plurality of sidelink messages and based on a first time broadcasted by the suspicious time source being different from a second time broadcasted by a set of other sources of the plurality of sources. In some aspects, the apparatus 1004 may include means for refraining from selecting the suspicious time source based on the identification. In some aspects, the apparatus 1004 may include means for transmitting, to the suspicious time source or at least one other wireless device, information regarding the suspicious time source being potentially inaccurate. In some aspects, the apparatus 1004 may include means for selecting the time source based on a distance traveled within the GNSS denied environment associated with the time source being less than a distance threshold. In some aspects, the apparatus 1004 may include means for selecting the time source based on a time inside the GNSS denied environment associated with the time source being less than a time threshold. In some aspects, the apparatus 1004 may include means for determining, using the time provided by the time source, a position associated with the wireless device or a second wireless device. In some aspects, the apparatus 1004 may include means for refraining from adjusting the time provided by the time source until the wireless devices leaves the GNSS denied environment or enters a GNSS enabled environment. In some aspects, the apparatus 1004 may include means for determining, based on receiving a GNSS signal, a position associated with the wireless device using the time provided by the time source. In some aspects, the apparatus 1004 may include means for decoding, using the time provided by the time source, one or more V2X messages. In some aspects, the apparatus 1004 may include means for outputting an indication of at least one of the performed positioning activity, the performed timing maintenance activity, or the performed communication activity. In some aspects, the apparatus 1004 may include means for transmitting the indication of at least one of the performed positioning activity, the performed timing maintenance activity, or the performed communication activity. In some aspects, the apparatus 1004 may include means for storing the indication of at least one of the performed positioning activity, the performed timing maintenance activity, or the performed communication activity. The means may be the component 198 of the apparatus 1004 configured to perform the functions recited by the means. As described supra, the apparatus 1004 may include the TX processor 368, the RX processor 356, and the controller/processor 359. As such, in one configuration, the means may be the TX processor 368, the RX processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean “one and only one” unless specifically so stated, but rather “one or more.” Terms such as “if,” “when,” and “while” do not imply an immediate temporal relationship or reaction. That is, these phrases, e.g., “when,” do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method for wireless communication performed by a wireless device, including: receiving, in a global navigation satellite system (GNSS) denied environment, a plurality of sidelink messages from a plurality of sources; selecting a time source from the plurality of sources based on the plurality of sidelink messages and based on at least one of: a respective distance traveled within the GNSS denied environment associated with each source of the plurality of sources or a respective time inside the GNSS denied environment of the plurality of sources; and performing, based on a time provided by the time source, at least one of a positioning activity, a timing maintenance activity, or a communication activity.

Aspect 2 is the method of aspect 1, where selecting the time source includes: selecting the time source from the plurality of sources based on the plurality of sidelink messages and based on at least one of: the respective distance traveled within the GNSS denied environment, the respective time inside the GNSS denied environment, a respective path history, or sensor data associated with the wireless device.

Aspect 3 is the method of any of aspects 1-2, further including: identifying a suspicious time source from the plurality of sources based on the plurality of sidelink messages and based on a first time broadcasted by the suspicious time source being different from a second time broadcasted by a set of other sources of the plurality of sources; and refraining from selecting the suspicious time source based on the identification.

Aspect 4 is the method of aspect 3, where the suspicious time source is an on-board-unit (OBU) associated with a vehicle or a road-side-unit (RSU).

Aspect 5 is the method of aspect 4, where the suspicious time source is the RSU, and further including: transmitting, to the suspicious time source or at least one other wireless device, information regarding the suspicious time source being potentially inaccurate.

Aspect 6 is the method of any of aspects 1-5, where selecting the time source includes: selecting the time source based on the distance traveled within the GNSS denied environment associated with the time source being less than a distance threshold.

Aspect 7 is the method of any of aspects 1-6, where selecting the time source includes: selecting the time source based on the time inside the GNSS denied environment associated with the time source being less than a time threshold.

Aspect 8 is the method of any of aspects 1-7, where performing the positioning activity includes: determining, using the time provided by the time source, a position associated with the wireless device or a second wireless device.

Aspect 9 is the method of any of aspects 1-8, where performing the timing maintenance activity includes: refraining from adjusting the time provided by the time source until the wireless devices leaves the GNSS denied environment or enters a GNSS enabled environment; and determining, based on receiving a GNSS signal, a position associated with the wireless device using the time provided by the time source.

Aspect 10 is the method of any of aspects 1-8, where performing the communication activity includes: decoding, using the time provided by the time source, one or more vehicle-to-everything (V2X) messages.

Aspect 11 is the method of any of aspects 1-10, where the GNSS denied environment is an environment where a GNSS signal is not available for the wireless device.

Aspect 12 is the method of any of aspects 1-11, where the wireless device is an on-board-unit (OBU) associated with a vehicle.

Aspect 13 is the method of any of aspects 1-12, further including: outputting an indication of at least one of the performed positioning activity, the performed timing maintenance activity, or the performed communication activity.

Aspect 14 is the method of aspect 13, where outputting the indication of at least one of the performed positioning activity, the performed timing maintenance activity, or the performed communication activity includes: transmitting the indication of at least one of the performed positioning activity, the performed timing maintenance activity, or the performed communication activity; or storing the indication of at least one of the performed positioning activity, the performed timing maintenance activity, or the performed communication activity.

Aspect 15 is an apparatus for wireless communication at a wireless device including at least one memory and at least one processor coupled to the at least one memory and, based at least in part on information stored in the at least one memory, the at least one processor is configured, individually or in combination, to implement any of aspects 1 to 14.

Aspect 16 is the apparatus of aspect 15, further including one or more transceivers or one or more antennas coupled to the at least one processor.

Aspect 17 is an apparatus for wireless communication at a wireless device including means for implementing any of aspects 1 to 14.

Aspect 18 is a computer-readable medium (e.g., a non-transitory computer-readable medium) storing computer executable code, where the code when executed by at least one processor causes the at least one processor to implement any of aspects 1 to 14.

What is claimed is:

1. An apparatus for wireless communication at a wireless device, comprising:

at least one memory; and at least one processor coupled to the at least one memory and, based at least in part on information stored in the at least one memory, the at least one processor is configured to cause the wireless device to:

receive, in a global navigation satellite system (GNSS) denied environment, a plurality of sidelink messages from a plurality of sources;

select a time source from the plurality of sources based on at least one of: a respective distance traveled within the GNSS denied environment associated with each source of the plurality of sources or a respective time inside the GNSS denied environment associated with each source of the plurality of sources, wherein the plurality of sidelink messages comprises an indication of the respective distance traveled within the GNSS denied environment associated with each source of the plurality of sources or the respective time inside the GNSS denied environment of the plurality of sources; and perform, based on a time provided by the time source, at least one of a positioning activity, a timing maintenance activity, or a communication activity.

2. The apparatus of claim 1, wherein to select the time source, the at least one processor is configured to cause the wireless device to:

select the time source from the plurality of sources a respective path history, or sensor data associated with the wireless device, wherein the plurality of sidelink messages comprises a second indication of the respective path history or the sensor data associated with the wireless device.

3. The apparatus of claim 1, wherein the at least one processor, is further configured to cause the wireless device to:

identify a suspicious time source from the plurality of sources based on a first time broadcasted by the suspicious time source being different from a second time broadcasted by a set of other sources of the plurality of sources; and refrain from selecting the suspicious time source based on the identification.

4. The apparatus of claim 3, wherein the suspicious time source comprises an on-board-unit (OBU) associated with a vehicle or a road-side-unit (RSU).

5. The apparatus of claim 4, wherein the suspicious time source comprises the RSU, and wherein the at least one processor is further configured to cause the wireless device to:

transmit, to the suspicious time source or at least one other wireless device, information regarding the suspicious time source being potentially inaccurate.

6. The apparatus of claim 1, wherein to select the time source based on the respective distance traveled within the GNSS denied environment associated with each source of the plurality of sources, the at least one processor is configured to cause the wireless device to:

select the time source based on the respective distance traveled within the GNSS denied environment associated with the time source being less than a distance threshold.

7. The apparatus of claim 1, wherein to select the time source based on the respective time inside the GNSS denied environment associated with each source of the plurality of sources, the at least one processor is configured to cause the wireless device to:

select the time source based on the respective time inside the GNSS denied environment associated with the time source being less than a time threshold.

8. The apparatus of claim 1, wherein to perform the positioning activity, the at least one processor is configured to cause the wireless device to:

determine, using the time provided by the time source, a position associated with the wireless device or a second wireless device, wherein the time comprises a coordinated universal time (UTC) time.

9. The apparatus of claim 1, wherein to perform the timing maintenance activity, the at least one processor is configured to cause the wireless device to:

refrain from adjusting the time provided by the time source until the wireless devices leaves the GNSS denied environment or enters a GNSS enabled environment; and determine, based on receiving a GNSS signal, a position associated with the wireless device using the time provided by the time source.

10. The apparatus of claim 1, wherein to perform the communication activity, the at least one processor is configured to cause the wireless device to:

decode, using the time provided by the selected time source, one or more vehicle-to-everything (V2X) messages.

11. The apparatus of claim 1, wherein the GNSS denied environment is an environment where a GNSS signal is not available for the wireless device.

12. The apparatus of claim 1, wherein the wireless device comprises an on-board-unit (OBU) associated with a vehicle, the apparatus further comprising at least one of a transceiver or an antenna coupled to the at least one processor, wherein, to receive the plurality of sidelink messages, the at least one processor is further configured to cause the wireless device to:

receive the plurality of sidelink messages via at least one of the transceiver or the antenna.

13. The apparatus of claim 1, wherein the at least one processor is further configured to cause the wireless device to:

output a second indication of at least one of the performed positioning activity, the performed timing maintenance activity, or the performed communication activity.

14. The apparatus of claim 13, wherein to output the indication of at least one of the performed positioning activity, the performed timing maintenance activity, or the performed communication activity, the at least one processor is configured to cause the wireless device to:

transmit the indication of at least one of the performed positioning activity, the performed timing maintenance activity, or the performed communication activity; or store the indication of at least one of the performed positioning activity, the performed timing maintenance activity, or the performed communication activity.

15. A method for wireless communication performed by a wireless device, comprising:

receiving, in a global navigation satellite system (GNSS) denied environment, a plurality of sidelink messages from a plurality of sources;

selecting a time source from the plurality of sources based on at least one of: a respective distance traveled within the GNSS denied environment associated with each source of the plurality of sources or a respective time inside the GNSS denied environment associated with each source of the plurality of sources, wherein the plurality of sidelink messages comprises an indication of the respective distance traveled within the GNSS denied environment associated with each source of the plurality of sources or the respective time inside the GNSS denied environment of the plurality of sources; and performing, based on a time provided by the time source, at least one of a positioning activity, a timing maintenance activity, or a communication activity.

16. The method of claim 15, wherein selecting the time source comprises:

selecting the time source from the plurality of sources further based on at least one of: a respective path history, or sensor data associated with the wireless device, wherein the plurality of sidelink messages comprises a second indication of the respective path history or the sensor data associated with the wireless device.

17. The method of claim 15, further comprising:

identifying a suspicious time source from the plurality of sources based on a first time broadcasted by the suspicious time source being different from a second time broadcasted by a set of other sources of the plurality of sources; and refraining from selecting the suspicious time source based on the identification.

18. The method of claim 17, wherein the suspicious time source comprises an on-board-unit (OBU) associated with a vehicle or a road-side-unit (RSU).

19. The method of claim 18, wherein the suspicious time source comprises the RSU, and further comprising:

transmitting, to the suspicious time source or at least one other wireless device, information regarding the suspicious time source being potentially inaccurate.

20. The method of claim 15, wherein selecting the time source based on the respective distance traveled within the GNSS denied environment associated with each source of the plurality of sources comprises:

selecting the time source based on the respective distance traveled within the GNSS denied environment associated with the time source being less than a distance threshold.

21. The method of claim 15, wherein selecting the time source based on the respective time inside the GNSS denied environment associated with each source of the plurality of sources comprises:

selecting the time source based on the respective time inside the GNSS denied environment associated with the time source being less than a time threshold.

22. The method of claim 15, wherein performing the positioning activity comprises:

determining, using the time provided by the time source, a position associated with the wireless device or a second wireless device, wherein the time comprises a coordinated universal time (UTC) time.

23. The method of claim 15, wherein performing the timing maintenance activity comprises:

refraining from adjusting the time provided by the time source until the wireless devices leaves the GNSS denied environment or enters a GNSS enabled environment; and determining, based on receiving a GNSS signal, a position associated with the wireless device using the time provided by the time source.

24. The method of claim 15, wherein performing the communication activity comprises:

decoding, using the time provided by the time source, one or more vehicle-to-everything (V2X) messages.

25. The method of claim 15, wherein the GNSS denied environment is an environment where a GNSS signal is not available for the wireless device.

26. The method of claim 15, wherein the wireless device comprises an on-board-unit (OBU) associated with a vehicle.

27. The method of claim 15, further comprising:

outputting second indication of at least one of the performed positioning activity, the performed timing maintenance activity, or the performed communication activity.

28. The method of claim 27, wherein outputting the indication of at least one of the performed positioning activity, the performed timing maintenance activity, or the performed communication activity comprises:

transmitting the indication of at least one of the performed positioning activity, the performed timing maintenance activity, or the performed communication activity; or storing the indication of at least one of the performed positioning activity, the performed timing maintenance activity, or the performed communication activity.

29. An apparatus for wireless communication at a wireless device, comprising:

means for receiving, in a global navigation satellite system (GNSS) denied environment, a plurality of sidelink messages from a plurality of sources;

means for selecting a time source from the plurality of sources based on at least one of: a respective distance traveled within the GNSS denied environment associated with each source of the plurality of sources or a respective time inside the GNSS denied environment associated with each source of the plurality of sources, wherein the plurality of sidelink messages comprises an indication of the respective distance traveled within the GNSS denied environment associated with each source of the plurality of sources or the respective time inside the GNSS denied environment of the plurality of sources; and means for performing, based on a time provided by the time source, at least one of a positioning activity, a timing maintenance activity, or a communication activity.

30. A non-transitory computer-readable medium storing computer executable code, the code when executed by at least one processor causes the at least one processor to:

receive, in a global navigation satellite system (GNSS) denied environment, a plurality of sidelink messages from a plurality of sources;

select a time source from the plurality of sources based on at least one of: a respective distance traveled within the GNSS denied environment associated with each source of the plurality of sources or a respective time inside the GNSS denied environment associated with each source of the plurality of sources, wherein the plurality of sidelink messages comprises an indication of the respective distance traveled within the GNSS denied environment associated with each source of the plurality of sources or the respective time inside the GNSS denied environment of the plurality of sources; and perform, based on a time provided by the time source, at least one of a positioning activity, a timing maintenance activity, or a communication activity.

* * * * *